Patented Aug. 7, 1934

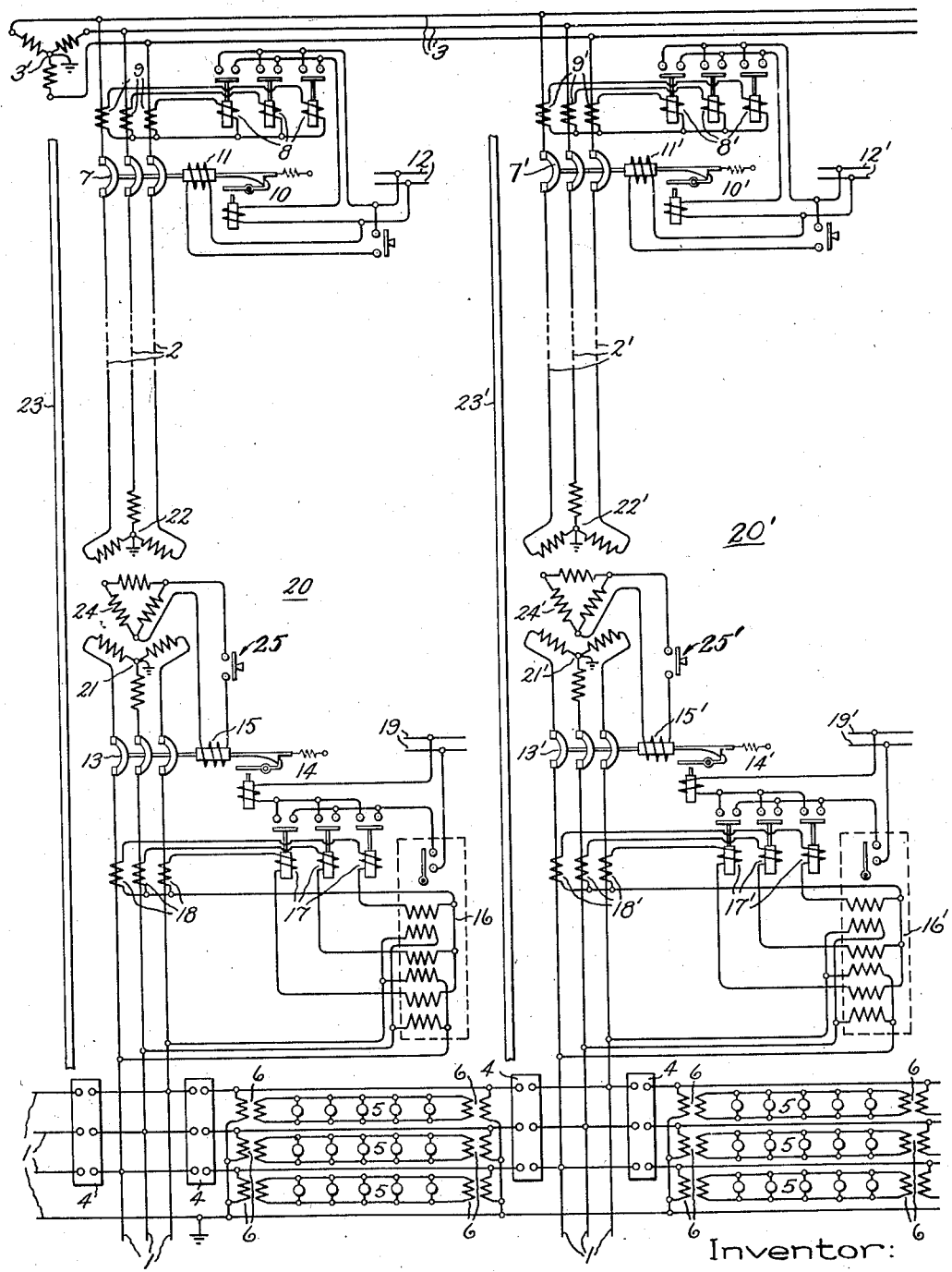

1,969,541

UNITED STATES PATENT OFFICE 1,969,541

ELECTRICAL PROTECTIVE SYSTEM

David K. Blake, Scotia, N. Y., assignor to General Electric Company, a corporation of New York Application March 16, 1931, Serial No. 523,141

10 Claims. (Cl. 175—294)

My invention relates to electrical protective systems and particularly to protective systems for polyphase electrical distribution systems.

In electrical distribution systems of the type wherein a network of conductors is supplied with energy through a plurality of feeder circuits which are connected respectively to a suitable source or sources of power it is usually necessary to provide protective means for automatically isolating any feeder in which a fault occurs. This involves opening a switch at the generator end of the feeder so as to prevent injury to the generator or generators due to the flow of heavy fault current and it also involves the opening of a switch at the network end of the feeder so as to prevent the network from forcing power back through the feeder into the fault. Both of these switches must of course also be opened before repair work can be done on the feeder. For reasons of economy of transmission the voltage of the supply feeders is preferably greater than the voltage of the distribution network. It is therefore customary to connect a step down transformer in the supply feeder. Also for reasons of economy it is usual that the entire system be a polyphase system. Usually, but not necessarily, it is a three-phase system.

A further characteristic of such systems is that the network, which is often made up by the interconnection of previously installed radial four wire three-phase distribution circuits, is a four wire grounded neutral three-phase network. This means that the secondary or low voltage windings of the feeder circuit transformers must be star or Y connected with their neutral points solidly grounded.

If now the primary or high voltage windings of the transformers are mesh or delta connected, as is the usual way, a single phase to ground fault on a high voltage feeder can only be made to trip the circuit breaker between the fault and the network by means of a special auxiliary relay arrangement in addition to the usual reverse power relay arrangement for tripping the breaker in case of single or three phase line to line faults. This is because with a mesh connected primary winding no reverse power can flow as the result of a single phase to ground fault.

In accordance with my invention I employ a special transformer arrangement involving a star or Y connected primary winding and a special auxiliary winding for cooperating with other elements of the system and improving its operation. With this arrangement the same relay means which responds to the reverse power flow that is caused by line to line faults will also respond to single line to ground faults on the feeder.

An object of my invention is to provide a new, improved and simplified protective arrangement for electrical distribution systems.

My invention will be better understood from the following description taken in connection with the accompanying drawing and its scope will be pointed out in the appended claims.

Referring now to the single figure of the accompanying drawing, wherein I have shown diagrammatically an embodiment of my invention as applied to a network system of distribution comprising a medium voltage network 1 which is supplied with energy through feeder circuits 2 and 2'. These feeder circuits are connected to a power supply bus 3 which is energized from a grounded neutral star connected generator or transformer 3'. The network 1 is provided with a plurality of circuit breakers 4 for isolating any one of its sections in case of trouble thereon. The loads on the network 1 are designated by reference character 5. As shown these load devices are connected to the network through distribution transformers 6.

As the protective equipments associated with each of the feeder circuits are identical, the equipment associated with feeder circuit 2' will be designated by the prime character used for designating corresponding parts of the equipment associated with feeder circuit 2.

The protective equipment at the supply end of feeder 2 which serves to disconnect this feeder from the bus 3 when a fault occurs on the feeder 2 comprises a switch or circuit breaker 7 which is tripped through the actuation of one or more of the overload relays 8 which are connected to respond respectively to the currents in the conductors of the feeder 2. As shown, current transformers 9 are provided for this purpose. The tripping means 10 and reclosing means 11 of the breaker 7 are energized from any suitable source of current supply such as the supply bus 12.

The protective equipment at the network end of the feeder 2 comprises a switch or circuit breaker 13 provided with tripping means 14 and reclosing means 15. Control of the tripping means is secured by the well known reverse power overload protective relay arrangement which in the illustrated embodiment is shown as comprising a reverse power relay 16 and overcurrent relays 17 connected in series relation with the current coils of the reverse power relay. As shown, the current windings of the relays are connected to feeder 2 by means of suitable current transformers 18, while the potential windings of the reverse power relay are shown as connected directly between the conductors of the feeder, although it will be obvious to those skilled in the art that intermediate potential transformers could be used if desired. Relay 16 is essentially a three-phase wattmeter so connected that its contacts close when the power flow through feeder 2 is from the network instead of to the network. As shown, the contacts of the overload relays 17 are connected in parallel with each other and in series with the contacts of reverse power relay 16 in a circuit including the tripping coil of breaker 13 and a suitable source of tripping power such as a control bus 19.

A transformer 20 is provided for stepping down the high voltage of the feeder 2 to the voltage of the network 1. As this network is a four-wire grounded neutral three-phase network it is essential that the secondary or low voltage winding 21 of transformer 20 be Y or star connected with its neutral point solidly grounded. In order that the reverse power relay 16 will operate when a line to ground fault occurs on feeder 2 I connect the high voltage or primary winding 22 of the transformer 20 in star or Y with its neutral point solidly grounded.

With such a connection of the transformer windings any third harmonic currents, which are unavoidably present to a greater or less extent in the transformer exciting current will tend to flow in the conductors of feeder circuit 2 and return through the ground. These high frequency currents will very often cause interference in telephone circuits which very frequently are strung parallel to the feeder circuit, as illustrated in the drawing by telephone cable 23. In order to overcome this I provide a tertiary delta connected winding 24 for the transformer 20. The effect of this winding is to provide a low impedance path for the third harmonics in the exciting current of the transformer because the third harmonic voltages of a three phase circuit are in phase with each other in each of the phases of the circuit and consequently they will be in phase with each other around the loop circuit of the tertiary winding 24 which circuit represents a short circuit for the current. This winding therefore reduces the amount of third harmonic currents in the conductors of the feeder and hence it reduces telephone interference. Tertiary winding 24 also serves another important purpose. Thus energy of a certain fairly low voltage is required for the reclosing means 15 of circuit breaker 13 and I so construct the tertiary winding 24 that it will supply current at the proper voltage for this purpose. In this manner it is not necessary to provide an auxiliary source for the reclosing means 15 for the circuit breaker. While I have shown merely single phase means for reclosing the circuit breaker and have consequently shown only one phase of the tertiary winding 24 supplying energy to this means, it will be obvious to those skilled in the art that three-phase means, such as a three phase motor might equally well be used for closing the circuit breaker, in which case three phase power could be obtained from the tertiary winding 24. I have also shown manual means 25 for controlling the reclosing means of the circuit breaker. It will be obvious to those skilled in the art, however, that any well known automatic reclosing control means may be used if desired.

The operation of the illustrated embodiment of my invention is as follows. In its normal state circuit breakers 7 and 13 will be closed, bus 3 will be energized and power will be flowing from this bus through the feeders into the network 1. If now a three phase line to line or a single phase line to line short circuit or fault occurs on feeder 2, a large rush of current to the fault will cause overload relays 8 to trip the circuit breaker 7, thus disconnecting feeder circuit 2 from bus 3. Power will now flow from bus 3 through feeder 2' to network 1 and reversely through breaker 13 and transformer 20 to the fault. However, this large reverse power will actuate both the reverse power relay 16 and the overload relays 17, causing them to close their contacts and complete the tripping circuit for circuit breaker 13. In this manner the feeder circuit 2 will become isolated.

If now a single phase or line conductor to ground fault occurs instead of a line to line fault the circuit breaker 7 will be tripped as before. Furthermore, due to the star or Y connection of the primary winding 22 of transformer 20 reverse power will also flow from the network 1 to the fault through the breaker 13 and transformer 20. It should be noted that this would not occur if the primary winding were meshed or delta connected for the grounding of one point of the delta or mesh would merely result in an unbalance of the three phase voltages but no reverse power or current would flow. Heretofore this situation has been taken care of by a special system of connections involving additional transformers and relays. As, however, reverse power flows in the arrangement which I have disclosed it will be obvious that the usual reverse power relay and overcurrent relay will also serve to trip the breaker 13 on ground or single phase ground faults as well as upon line to line faults on feeder 2.

It should also be noted that the tertiary mesh or delta connected winding 24 acts to minimize interference with telephone circuits which would otherwise be caused by the third harmonic current which would flow as the result of this connection of the primary and secondary winding of transformer 20.

While I have shown and described the particular embodiment of my invention, it will be obvious to those skilled in the art that changes and modifications may be made without departing from my invention and I therefore aim in the appended claims to cover all such changes and modifications as fall within the true spirit and scope of my invention.

What I claim as new and desire to secure by Letters Patent of the United States, is:

1. In combination, a polyphase distribution network, a plurality of feeder circuits connected to energize said network, a step down transformer in one of said circuits, a circuit breaker in said circuit between said transformer and the network, means responsive to a reverse power flow through said transformer for tripping said circuit breaker, and a solidly grounded neutral star connected primary winding on said transformer for permitting reverse power to flow through said transformer as a result of ground faults on said feeder circuit whereby said circuit breaker may be tripped by said reverse power responsive means as a result of such faults.

2. In combination, a grounded neutral polyphase distribution network, a plurality of feeder circuits connected to energize said network, a transformer in one of said feeder circuits, said transformer having a solidly grounded neutral secondary winding whereby network loads to ground may be energized, a circuit breaker between said transformer and said network, a reverse power relay for tripping said breaker when reverse power flows through said transformer, and a solidly grounded neutral primary winding on said transformer for permitting reverse power to flow through said transformer as a result of a ground fault on said feeder circuit whereby said reverse power relay will trip said circuit breaker.

3. In combination, a polyphase electric circuit, electrical generating means normally connected to one end of said circuit, a large power capacity electrical network which is adapted to be energized by a plurality of sources connected to the other end of said circuit, a transformer connected in said circuit, reverse power protective means connected with said circuit, said transformer having grounded neutral star connected primary and secondary windings so that reverse power will flow through said transformer and circuit and thereby actuate said protective means when a single phase to ground fault occurs on said circuit between said transformer and generator.

4. In combination, a polyphase electric circuit, electrical generating means normally connected to one end of said circuit, a large power capacity electrical network which is adapted to be energized by a plurality of sources connected to the other end of said circuit, a transformer connected in said circuit, reverse power portective means connected with said circuit, said transformer having grounded neutral star connected primary and secondary windings so that reverse power will flow through said transformer and circuit and thereby actuate said protective means when a single phase to ground fault occurs on said circuit between said transformer and generator, and means for minimizing the flow of third harmonic currents in said circuits.

5. In combination, a relatively high voltage feeder circuit, a relatively low voltage grounded neutral four wire three phase network energized by said feeder circuit through a step-down transformer having high and low voltage windings connected to said feeder circuit and network respectively, and means including a reverse power relay and a grounded neutral star connection of the high voltage transformer winding for protecting said network from line to ground faults on said high voltage feeder circuit.

6. In combination, a three phase source of current supply, a three phase network, a three phase feeder circuit connecting said source and said network, a transformer in said feeder circuit adjacent said network, a circuit breaker in said feeder adjacent said source, a second circuit breaker in said feeder between said network and said transformer, overload responsive means for tripping said first breaker and means including a reverse power relay and a grounded neutral star connection of the winding of said transformer which is electrically connected to said source for tripping said second breaker upon overload reverse power flowing through said transformer as a result of a single phase to ground fault on said feeder.

7. In an electrical distribution system of the type comprising a polyphase grounded neutral network which is energized through stepdown transformers from a plurality of polyphase feeder circuits, the combination of solidly grounded neutral star connected high voltage primary windings on said transformers with reverse power overload protective means for said network and feeders, said means responding to overload reverse current flow through said transformer as a result of a single phase to ground fault on one of said feeders as well as to a reverse power flow from any other cause.

8. In combination, a grounded neutral three phase source of current supply, a three phase grounded neutral network, a feeder circuit connecting said source and said network, a transformer having grounded neutral star connected primary and secondary windings connected in said feeder circuit, a tertiary delta connected winding on said trasformer, a circuit breaker connected between said transformer and said network, tripping means for said circuit breaker, over current reverse power relay means for controlling said tripping means, said relay means being responsive to the three line currents and line voltages of said feeder circuit, reclosing means for said circuit breaker, said reclosing means being energizable from said delta connected tertiary winding.

9. In combination, a polyphase power transmission circuit, a polyphase power transformer connected in said circuit, said transformer having grounded neutral star connected primary and secondary windings, a tertiary mesh connected winding on said transformer, protective apparatus connected to said circuit, said protective apparatus having an operating winding, and connections for energizing said winding from said tertiary winding.

10. In combination, a polyphase power transmission circuit, a polyphase power transformer connected in said circuit, said transformer having grounded neutral connected primary and secondary windings, a tertiary mesh connected winding on said transformer, a circuit breaker connected in said circuit, and a reclosing circuit for said circuit breaker connected to be energized from said tertiary winding.

DAVID K. BLAKE.